United States Patent [19]

Lechner

[11] Patent Number: 4,730,735
[45] Date of Patent: Mar. 15, 1988

[54] TAPE STORAGE SYSTEM

[75] Inventor: Lloyd Lechner, Mayville, Wis.

[73] Assignee: Tab Products Company, Palo Alto, Calif.

[21] Appl. No.: 924,778

[22] Filed: Oct. 30, 1986

[51] Int. Cl.$^4$ .............................................. A47F 7/00
[52] U.S. Cl. .................................... 211/41; 206/387; 211/126; 312/8
[58] Field of Search ................. 211/191, 126, 88, 162, 211/94; 206/387; 312/89, 11, 10

[56] References Cited

U.S. PATENT DOCUMENTS

| | | | |
|---|---|---|---|
| 2,974,807 | 3/1961 | Furrer | 211/126 |
| 3,677,396 | 7/1972 | Staar | 206/387 |
| 3,726,411 | 4/1973 | Jones | 211/126 |
| 4,457,436 | 7/1984 | Kelley | 211/94 X |
| 4,577,914 | 3/1986 | Stravitz | 312/10 |
| 4,600,107 | 7/1986 | Price et al. | 211/41 |
| 4,648,514 | 3/1987 | Niles | 211/41 |
| 4,678,151 | 7/1987 | Radek | 211/94 X |

Primary Examiner—Robert W. Gibson, Jr.
Attorney, Agent, or Firm—Donald Cayen

[57] ABSTRACT

A versatile system for storing IBM 3480 cartridge system tapes positively retains the cartridges in compartmented containers. Positive retention is accomplished by small upstanding tabs that engage a notch formed in each tape cartridge. The container is useable with storage racks designed for new installations of the IBM 3480 system. The container is further useable in retrofit applications in which the IBM 3480 cartridge system replaces previous magnetic tape reels. Retrofit installations may include standard rails for attaching to pre-existing storage racks and hanger bars fastened to the containers for hanging the containers on the rails. The present invention includes double channel rails designed to be vertically spaced on pre-existing racks that cooperate to suspend the containers in vertical attitudes. The containers may include latches on the bottom panels that cooperate with the rails to prevent undesired container tilting on the rack.

26 Claims, 11 Drawing Figures

TAPE STORAGE SYSTEM

BACKGROUND OF THE INVENTION

1. Field of the Invention

This invention pertains to storage apparatus, and more particularly to apparatus for releaseably retaining computer tape cartridges.

2. Description of the Prior Art

Included in the ongoing improvements in the computer field are data storage tapes that occupy less space while containing as much data as prior tapes. For example, the IBM 3480 cartridge system tapes are considerably smaller than the prior cylindrical magnetic reel tapes.

The introduction of the IBM 3480 cartridge system tapes requires the design and development of containers for storing the cartridges. Desirable features of the containers include positive cartridge retention, easy cartridge removal, and good visibility of the stored cartridges. Further, the containers should be easily insertable into and removable from library storage equipment holding several rows of side-by-side containers.

A known cartridge system tape container comprises a pair of horizontal shelves divided into vertical compartments sized to accept the cartridges. At the rear of each compartment is a biasing member similar to a leaf spring that tends to push the cartridge forwardly out of the compartment. Each compartment includes a lower lip that retains the cartridge in the compartment against the leaf spring biasing force. A cartridge is removed by pushing the upper front corner backwardly. The leaf spring then tips the cartridge lower edge above the lip, where it is held by the leaf spring. While generally satisfactory, the numerous leaf springs in the container render it quite expensive to manufacture, and the leaf springs are subject to fatigue. Moreover, it is often difficult to remove a cartridge from a compartment of the described container using only one hand. The cartridge upper front corner must be pushed with care so that it is tipped forwardly in the compartment by the leaf spring far enough to be grasped on the top and bottom surfaces. Otherwise, placing a finger of each hand on the top and bottom cartridge surfaces is necessary to pull a cartridge from its compartment.

Another prior container employs a solid wall at the back of each compartment. A strip of friction material is adhered to the bottom front portion of each compartment, so that a stored cartridge rests on the strip. That design is quite unacceptable, because the cartridges are not positively retained within the compartments. They therefore easily fall out when the containers are moved by hand or machine. Paradoxically, the friction strip makes it difficult to intentionally manually remove a cartridge from the container.

A third prior container includes a back wall with a pin in each compartment. The pins are adapted to enter a cartridge tape throat or tape opening to hold the cartridge in place. That design is undesirable, because the pins may distort the cartridges. Moreover, the tapes may become contaminated with foreign material.

In addition to the shortcomings previously described, the prior tape containers suffer the handicap of being restricted to use with limited types of library storage racks. Conventional cartridge containers require mounting racks having flat shelves to accept the container top and bottom panels therebetween. In that arrangement, the containers are stored in close proximity to each other on four sides, with no clearance between them for manual grasping and removal from the storage racks. Consequently, to remove a prior container from the storage rack, it is necessary to first remove two cartridges from their compartments, insert a hand into each vacant compartment, pull the container from the rack, place the container in the desired location, and replace the two removed cartridges. Such a procedure is undesirably time consuming and cumbersome.

Typically, the older cylindrical magnetic tape reel storage racks do not have flat platforms that suit prior cartridge containers. As a result, the computer system owner is required to purchase new storage racks if he uses conventional containers when converting to the new 3480 tape cartridges.

Thus, a need exists for an inexpensive tape cartridge storage system that positively retains the cartridges in containers that are compatible with pre-existing tape reel racks.

SUMMARY OF THE INVENTION

In accordance with the present invention, an economical computer tape storage system is provided that positively retains IBM 3480 tape cartridges in new and retrofit library storage equipment. This is accomplished by apparatus that includes a multi-compartment box comprising vertical tabs for engaging the cartridge notches and rails for suspending the boxes on pre-existing tape storage racks.

The box compartments are formed within a container that has horizontal panels and vertical ribs arranged into ten five-sided compartments. Each compartment has an open front side and a width and height dimensioned to loosely accept a computer data tape cartridge through the open side. Each compartment has a back wall that locates the cartridge with respect to a series of tabs that are spaced along the lower portions of the compartment open sides. Adjacent tabs cooperate to positively retain the cartridge within the compartment. For that purpose, each tab may straddle the rib between two adjacent compartments, so that the facing ends of adjacent tabs are separated by a predetermined distance along the bottom center of each compartment opening. The end of the tab on the right side of each compartment is sloped so as to enter the notch of the tape cartridge within the compartment; the notch is formed in a standard manner on all 3480 tape cartridges. The end of the tab on the left side of each compartment locates the cartridge side opposite the notch and retains the cartridge notch over the right tab. To remove the cartridge from the compartment, it must be lifted manually so that the notch is clear of the right tab.

Further in accordance with the present invention, the tape storage system is universally adaptable to new and retrofit library storage racks. For example, the boxes are useable with the racks that were previously used for older style cylindrical magnetic tape reels. To adapt the cartridge tape boxes of the present invention to existing storage racks, the boxes are furnished with hanging bars that permit suspending the boxes from standard rails that are commonly used in other information storage systems. The hanger bars and conventional rails are preferably used in conjunction with conventional box adapters that orient the boxes in a vertical attitude.

In the preferred embodiment, the tape storage system of the present invention includes a double channel rail that is adaptable to use on pre-existing magnetic reel storage racks. The double channel rail is shaped with a lower portion having an upturned channel that is generally similar to the lower portion of prior C-shaped rails. The upper portion of the double channel includes a second upturned channel that is above and horizontally offset from the lower channel. The upper and lower channels are connected by a horizontal section. The boxes are suspended by the hanger bars on the upturned ends of the rail lower channels. To locate the boxes in vertical attitudes, their lower back walls rest against a leg of the upper channel of a lower spaced rail.

To prevent the boxes from rotating on the racks, the lower panel of each box may be formed with a latch. The latch operates to permit swinging the box about an upper rail by means of the hanger bar to a vertical attitude against a lower rail. However, the latch cooperates with the upper channel of the lower rail to prevent opposite rotation. The hanger and latch design further enable the boxes to be slid horizontally along the rails without binding.

A further feature of the double channel rail of the present invention is that the upper and lower channel upturned ends are vertically spaced approximately one inch. That spacing permits easy insertion of a person's hands above and below the boxes to grasp and remove them from the rack without first removing cartridges from the compartments.

Other features, aims, and advantages of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
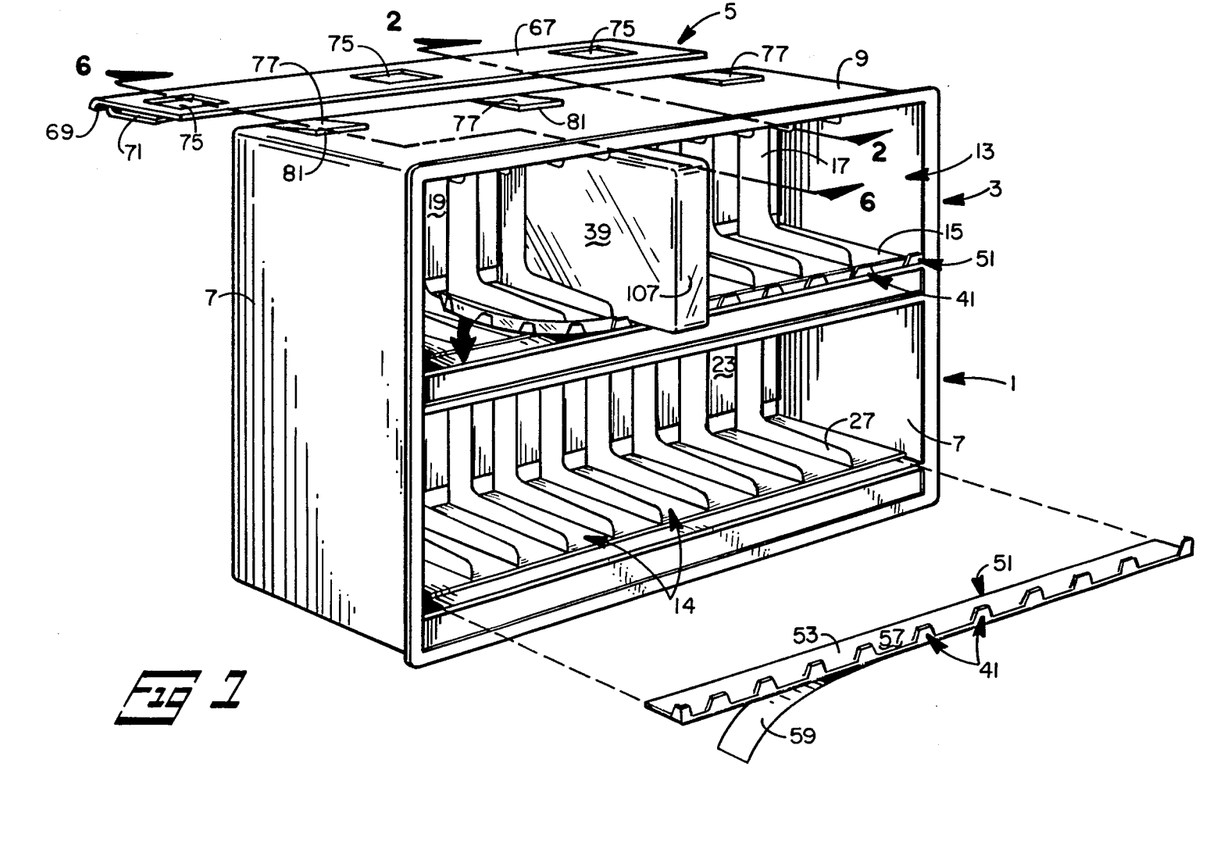
FIG. 1 is an exploded perspective view of the cartridge box of present invention.
Figure 2:
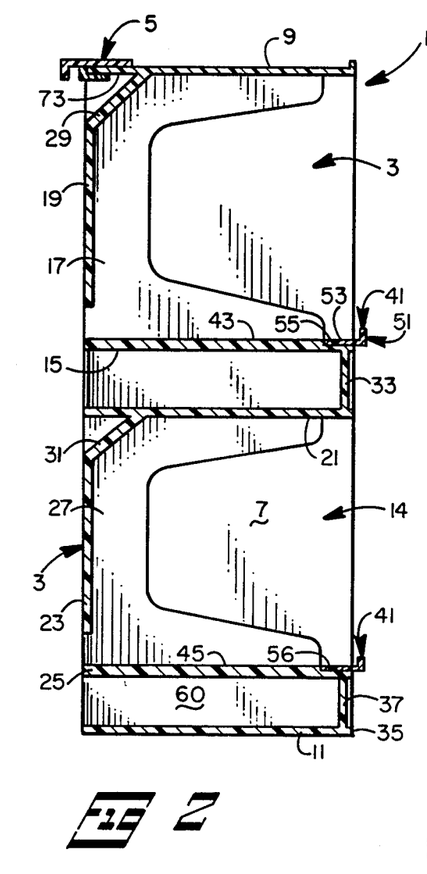
FIG. 2 is a cross sectional view taken along lines 2—2 of FIG. 1.
Figure 3:
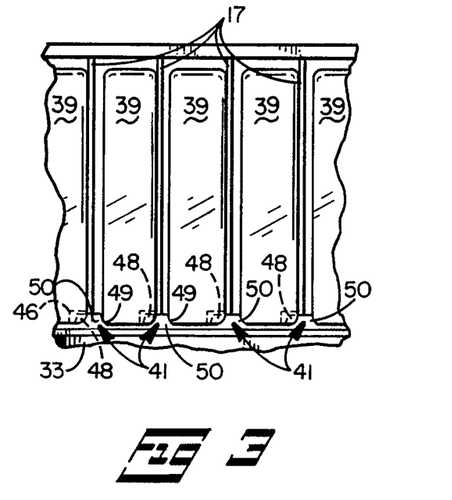
FIG. 3 is a partial front view of the box of the present invention showing tape cartridges in place within the box compartments.
Figure 4:
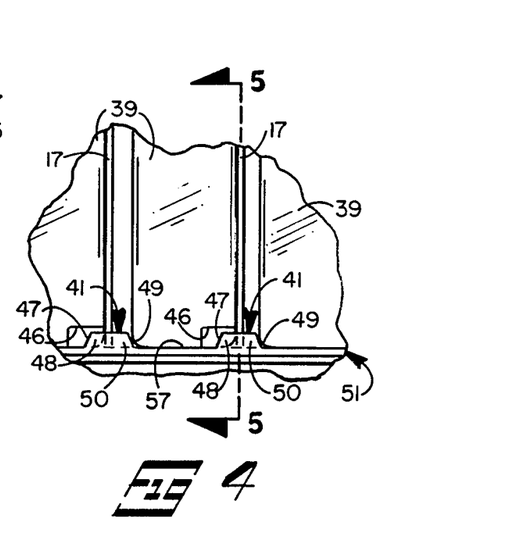
FIG. 4 is an enlarged view showing a tape cartridge retained in place in the box of the present invention.

Referring to FIGS. 1 and 2, a tape cartridge box 1 is illustrated that includes the present invention. The tape cartridge box is particularly useful for retaining IBM 3840 cartridge system tapes, but it will be understood that the invention is not limited to computer related applications.

The box 1 comprises a container portion 3, a hanger bar 5, and a plurality of upstanding tabs 41. The container portion 3 is preferably fabricated with a pair of spaced side walls 7, a top panel 9, and a bottom panel 11. The container is divided into upper and lower rows of five-sided compartments 13 and 14, respectively. Each compartment 13 in the upper row is bounded by the top panel 9, an upper floor 15, a pair of vertical generally C-shaped ribs 17, and a partial back wall 19. The compartments 14 of the lower row are bounded by a ceiling 21, back wall 23, floor 25, and ribs 27. The upper sections of the back walls 19 and 23 are formed with angle portions 29 and 31, respectively. The front edges of the floor 15 and ceiling 21 are connected by a vertical panel 33 that may be recessed slightly from the box front face 35. Similarly, the front edges of the floor 25 and bottom panel are connected by a recessed vertical panel 37. The side walls 7 form boundaries for the end compartments on the upper and lower rows. Preferably, each row contains ten compartments.

Each compartment 13 and 14 is sized to loosely accept an IBM 3480 cartridge system tape 39 through the compartment open front side. Accordingly, the dimension between adjacent ribs 17 and 27 is approximately 1.06 inches, and the vertical height of each compartment is approximately 4.44 inches. The depth of each compartment is approximately 4.25 inches.

In accordance with the present invention, each tape cartridge 39 is positively retained in a compartment 13 or 14 of the container 3 by a pair of upstanding tabs 41 located in the lower front of the open side of each compartment. Referring to FIGS. 1 and 3-5, a tab 41 preferably straddles each rib 17 and 27 so as to extend laterally into the open sides of the two compartments on either side of the rib. The tabs are located a predetermined distance from the cartridge back walls 19 and 23 so as to engage the notches 46, which are formed in the IBM 3480 tape cartridges 39, when the cartridges are fully inserted into the compartments. The base of each tab coincides with the upper surfaces 43 and 45 of the floors 15 and 25, respectively. Each tab protrudes approximately 0.08 inches above the floor surfaces 43 and 45. Each tab has a left section 48 that extends approximately 0.20 inches to the left of the corresponding rib into the right side of the adjacent compartment. Preferably, the left edges 47 of the tab left sections 48, are sloped at an angle of approximately 30 degrees to the vertical.

To assure that the cartridge notches 46 are retained over the respective tab left sections 48, the cartridges 39 are urged to the right side of each respective compartment 13 and 14 by the right edges 49 of the tab right sections 50 that extend to the right of the corresponding ribs 17 and 27 into the left sides of the compartments. The tab right edges 49 are located approximately 0.20 inches to the right of each respective rib. The tab right edges may be vertical, but a sloped edge is more desireable. The angle of the slope is preferably about 30 degrees to the vertical.

Figure 5:
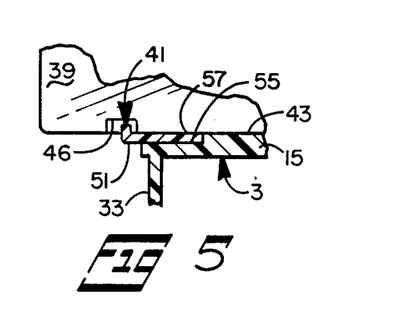
FIG. 5 is a cross-sectional view taken along lines 5—5 of FIG. 4.

The tabs 41 may be manufactured as integral parts of the box 1. In the illustrated construction, however, the tabs are formed as part of a box retainer 51. Referring primarily to FIG. 1, the box retainer 51 comprises an elongated flat base strip 53 that overhangs the floors 15 and 25. To the front edge of each strip 53 are integrally joined the upstanding tabs. As best illustrated in FIGS. 2 and 5, the box container portion 3 is fabricated with steps 55 and 56 for receiving the box retainer strip so that the top surface 57 thereof is flush with the floor surfaces 43 and 45. The box retainer may be secured to the steps 55 and 56 by any suitable means, such as mechanical fasteners or an adhesive. In FIG. 1, the box retainer is shown secured to the box 1 by a double sided adhesive tape 59.

The container portion 3 and the box retainer 51 of the box 1 of the present invention may be manufactured from any suitable material. A particularly satisfactory material for both components is polystyrene plastic molded into the required shapes.

Although the tape cartridges 39 are positively retained within the container 3, the cartridges are nevertheless very easy to insert and remove when desired from the respective compartments 13 and 14. To insert a cartridge, it is slid backwardly into a compartment over the tabs 41 until the cartridge notch 46 is over the tab left section 48 on the right side of the compartment. At that point, the cartridge tends to fall so that the tab right section engages the notch. At the same time, the cartridge slides downwardly and to the right along the right edge 49 of the tab right section 50 on the left side of the compartment, thereby assuring that the right tab section adjacent the tab edge 47 properly engages the cartridge notch. At that point, the cartridge is positively retained within the compartment against unintentional removal if the box is jostled through automatic or manual handling.

Figure 6:
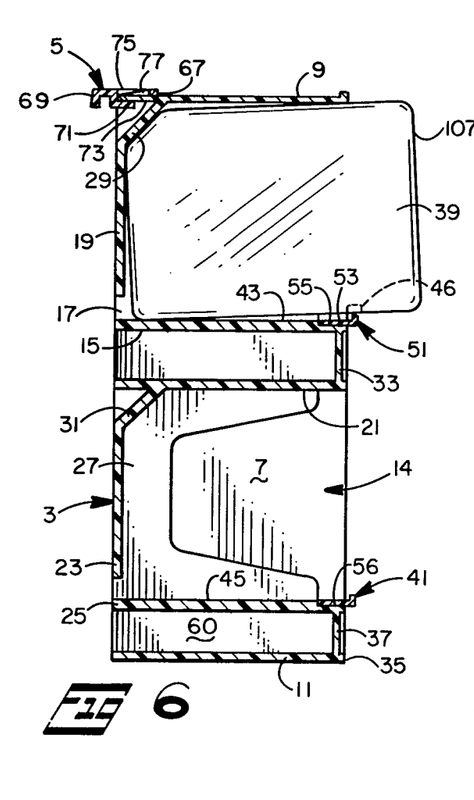
FIG. 6 a cross-sectional view taken along lines 6—6 of FIG. 1, but showing a tape cartridge in position for removal from the box.

To remove the cartridge 39 from a compartment 13 or 14, it is necessary only to lift the front end of the cartridge a small amount sufficient for the notch 46 to clear the tab 41. The cartridge is then pulled from the compartment without hindrance. See FIG. 6.

Further in accordance with the present invention, the box 1 is universally useable with storage racks designed specifically for prior IBM 3480 cartridge containers and with racks used with prior cylindrical magnetic tape reels. Typical prior IBM 3480 system storage racks, which are not shown herein, include shelves vertically spaced to accept the containers therebetween. The box of the present invention is supported on the prior racks by the bottom panel 11. A clip fastened to the rack shelf that supports the box bottom panel 11 slides over the bottom panel and into the space 60 between the bottom panel and the lower compartment floor 25 to thereby hold the box in place on the shelf. See FIG. 2.

Figure 7:
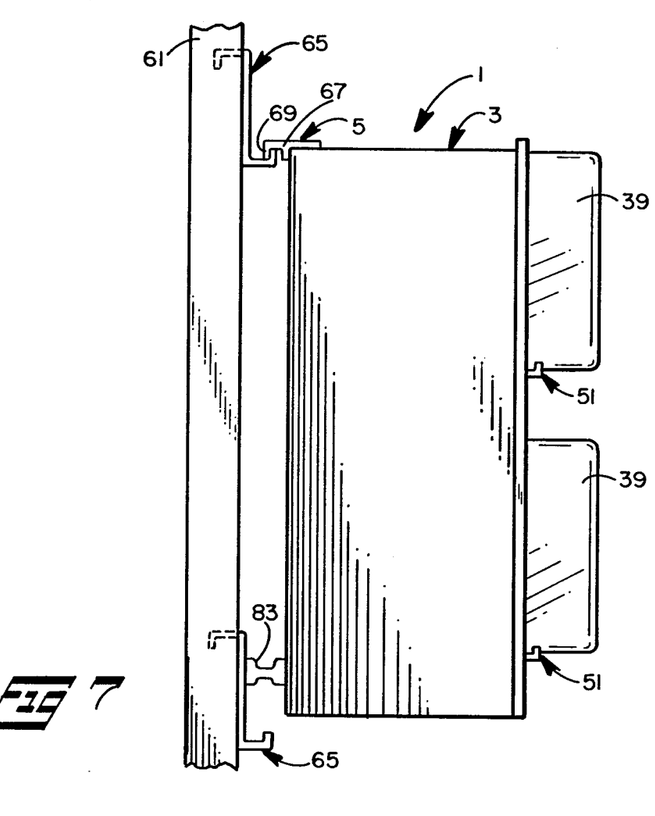
FIG. 7 is a side view of the cartridge box in place on a conventional storage rack rail.

In addition, the versatility of the present invention enables upgrading pre-existing systems for storing magnetic tape reels at minimum expense. Turning to FIG. 7, reference numeral 61 refers to one of several upstanding posts of a conventional rack for storing a quantity of cylindrical tape reels, not illustrated. The reel tape hanger beams are removed from the rack and replaced with conventional reverse bend horizontal rails 65 attached between the posts 61. The rails 65 may be attached to the posts by conventional means, such as tabs on the rails in conjunction with aligned slots in the posts, as is known in the art.

To adapt the box 1 of the present invention to the pre-existing racks, the box includes the hanger bar 5. As best shown in FIGS. 1 and 2, the hanger bar comprises a flat strip 67 that projects beyond the container back wall 19 and a lip 69 that depends downwardly from the back end of the strip. As shown in FIG. 7, the box is suspended on a rail 65 by means of the hanger bar. The hanger bar may be made from the same material as the container 3, such as molded polystyrene plastic.

The hanger bar 5 may be fastened to the container portion 3 by any suitable means, such as rivets or other mechanical fasteners between the flat strip 67 and the container top panel 9. However, a preferred mounting is as illustrated in FIGS. 1 and 2, wherein the hanger is releaseably mounted to the container. In that construction, the hanger bar is formed with two or more L-shaped clips 71 that engage the undersurface 73 of the container top panel 9. Above each clip 71, the strip defines an opening 75. Associated with each opening 75 is a catch 77 molded integrally with the top panel. The catch 77 is sized to be received within the hanger bar opening. The catch has a tapered top surface 79 that permits the hanger bar clips 71 to be slid along the undersurface 73 and the opening 75 to be snapped into engagement with the catch. The catch also includes a vertical front surface 81 that prevents removal of the hanger bar from the container unless the front edge 82 of the hanger bar strip is intentionally raised above the surface 81 to disengage from the catch. To maintain the boxes in vertical attitudes on the posts 61, conventional box adapters 83 may be joined to the rails 65 extending between the posts 61. The hanging design of the present invention allows easy relocation of the boxes merely by pushing them along the rails. Thus, hanger bar use with the container 3 is optional with the computer system owner. The removeable hanger bar renders the container universally interchangeable between storage in a conventional shelved rack specifically designed for the IBM 3480 cartridges, wherein the hanger bars are not used, and pre-existing reel type storage racks, wherein the hanger bars are mounted to the containers for suspending them from the rails. In that way, a computer owner can use the storage rack posts and trim, and he is not required to purchase entire new racks when he upgrades to the new cartridge tapes.

Figures 8, 9:
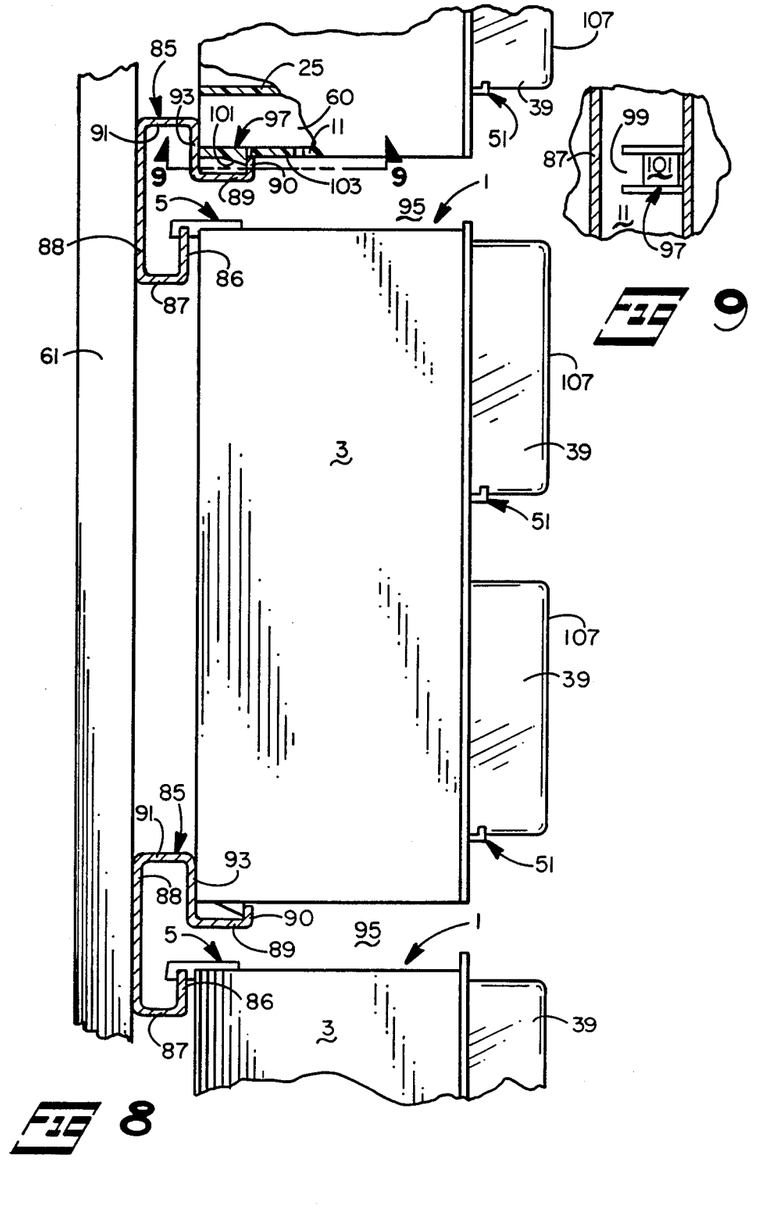
FIG. 8 is an enlarged side view, partially in section, of the cartridge box in place on a tape storage rack retrofit with the double channel rails of the present invention.
FIG. 9 is a cross-sectional view taken along lines 9—9 of FIG. 8.

It is a feature of the present invention that the box 1 may be simultaneously retained in a vertical position and prevented from rotating therefrom. Turning to FIG. 8, the post 61 of a pre-existing storage rack is shown retrofit with a series of double channel hanger rails 85. Each rail 85 is fabricated with an upturned lower channel 87 that has an upturned end 86. The lower channel 87 is generally similar to the lower portion of the conventional rails 65 of FIG. 7. One leg 88 of the lower channel is longer than the upturned end 86. The rail 85 also comprises an upper channel 89 that is located above and horizontally offset from the lower channel. Upper channel 89 has an upturned end 90 that is shorter than the opposite leg 93. The upper and lower channels are joined by a horizontal member 91 such that member 91 is above the lower channel. As best seen in FIG. 8, the hanger bars 5 of the boxes are suspended from the lower channels. The horizontal location of the upper channel legs 93 is such that they maintain the boxes suspended from the next higher rail in a vertical attitude. The double channel rails may be joined to the racks by a conventional tab and slot arrangement on retrofit applications and by welding them to the posts on new installations.

Referring to FIGS. 8 and 9, the boxes 1 are prevented from rotating on the rack by a latch 97 located on the bottom of each box. Each latch 97 is formed integrally with the bottom panel 11 and has a flexible hinge portion 99 and a tapered ledge 101. The latch operates to deflect and enter the upper channel 89 of a rail and thereby permit hanging the box in a vertical attitude. However, the box cannot be tilted from the vertical attitude with the hanger bar 5 in place on a rail 65. With the box in the vertical position and the latch in the operative position of FIGS. 8 and 9, it is still possible to slide the boxes along the rails. The latch is depressed into the space 60 when the box is placed on a conventional shelved rack.

An important aspect of the rail 85 of the present invention is that they provide clearance space 95 above and below each box 1 in a storage rack. Such clearance space 95 enables a person to easily remove a box from the rack. He merely inserts his hands above and below a box, lifts it slightly to disengage the hanger bar 5 from the lower channel 87 and the latch 97 from the associated upper channel 89, and pulls the box forwardly from the rack. The ease of box removal as compared with the prior requirements of removing and replacing two cartridges 39 from their compartments 13 or 14 is apparent. The tabs 41 operate to positively retain the cartridges in the compartments as the box is removed from and returned to the rack.

Figures 10, 11:
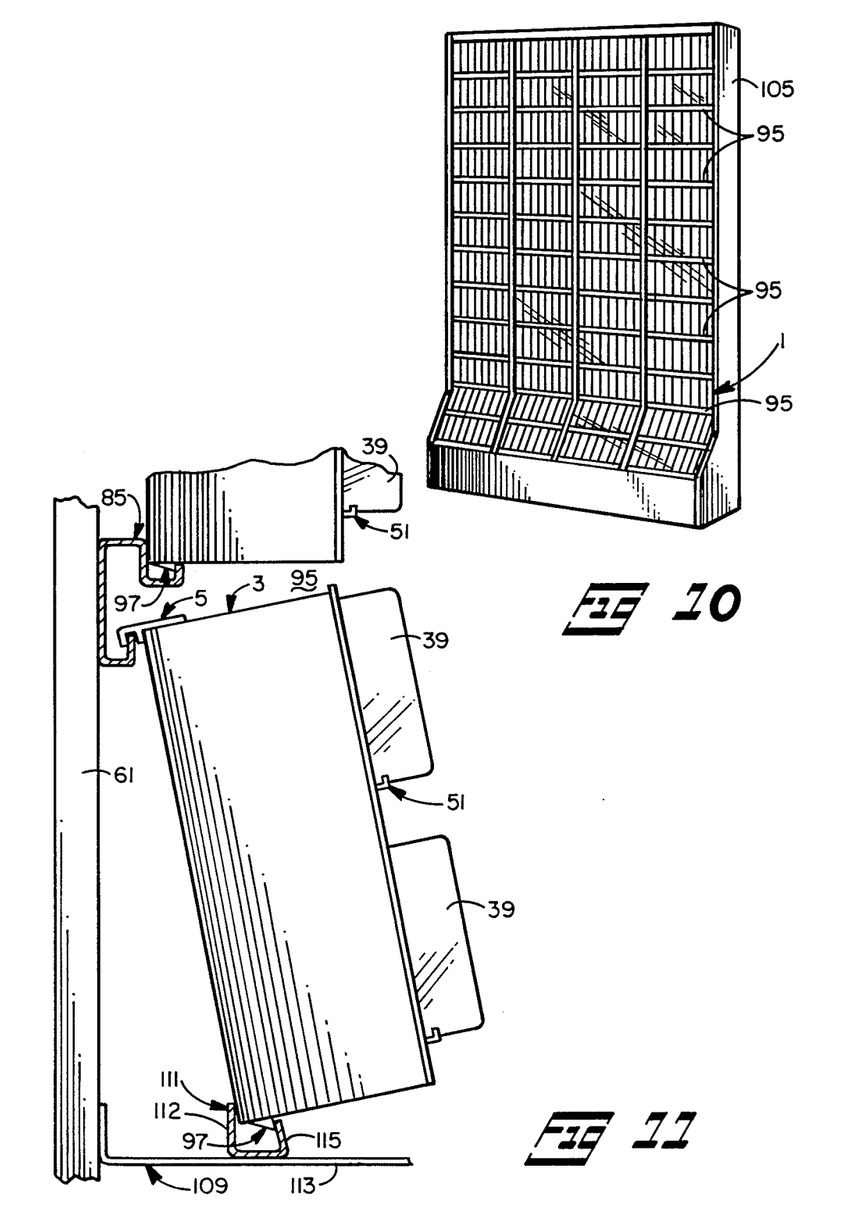
FIG. 10 is a perspective view of a library of cartridge boxes in a rack.
FIG. 11 is a side view, partially in section, of the lowermost cartridge boxes in the storage rack of FIG. 10.

Turning next to FIG. 10, a typical storage rack 105 is illustrated that stores a number of cartridge boxes 1. It will be understood that the storage rack 105 is not limited to the size or configuration shown, as wheeled carts, for example, are also known. To rapidly identify the various cartridges, coded labels are affixed to the surfaces of the recessed box panels 33 and 37. Labels are also typically attached to the cartridge outer faces 107. See FIGS. 1 and 6.

In the particular rack 105 illustrated in FIG. 10, the lowermost row of boxes 1 is inclined to the vertical. Such inclination allows easy reading of the box and cartridge labels. To hold the bottom row of boxes at the inclined attitude, a modified rail 109 is employed as the lowermost rail on the rack, FIG. 11. The rail 109 has a generally U-shaped portion 111 that is joined to a horizontal brace 113. The upturned back leg 112 of the U-shaped portion 111 is spaced outwardly from the rails 85 and supports the container back wall 19 or 23 to maintain the box at the desired angle. The U-shaped portion includes an upturned front leg 115 that cooperates with the latch 97 to prevent undesired tilting of the box.

Thus, it is apparent that there has been provided, in accordance with the invention, a tape storage system which fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In a container having a plurality of open sided compartments, each compartment partially defined by a floor and a pair of spaced vertical ribs, the compartments being adapted to hold selected data storage cartridges manufactured with a notch at a predetermined location on one of the cartridge surfaces, the cartridges being insertable into the compartments with the notched surfaces thereof in facing contact with the compartment floors and the notches located near the compartment open sides, the improvement comprising:
rigid means secured to the compartment floors for inflexibly and releaseably engaging the cartridge notches to positively retain the cartridges within the respective compartments.

2. In a container having a plurality of open sided compartments, each compartment partially defined by a floor and a pair of spaced vertical ribs, the compartments being adapted to hold selected data storage cartridges manfactured with a notch at a predetermined location on one of the cartridge surfaces, the cartridges being insertable into the compartments with the notched surfaces thereof in facing contact with the compartment floors and the notches located near the compartment open sides, the improvement comprising:
means secured to the compartment floors for releasably engaging the cartridge notches to positively retain the cartridges within the respective compartments, wherein the means for engaging the cartridge notches comprises first and second tabs partially extending from a rib into each compartment open side along the floor thereof, each first tab being adapted to engage the cartridge notch to thereby positively retain the cartridge in the compartment, and each second tab being adapted to urge the container away from the second tab and into notch engagement with the first tab.

3. The improved container of claim 2 wherein the tabs extend approximately 0.08 inches high above the respective compartment floors and approximately 0.20 inches from the respective ribs toward the center of the compartment open sides.

4. The improved container of claim 2 wherein the tabs are formed integrally with the container.

5. In a container having a plurality of open sided compartments, each compartment partially defined by a floor and a pair of spaced vertical ribs, the compartments being adapted to hold selected data storge cartridges manufactured with a notch at a predetermined location on one of the cartridge surfaces, the cartridges being insertable into the compartments with the notched surfaces thereof in facing contact with the compartment floors and the notches located near the compartment open sides, the improvement comprising:
means secured to the compartment floors for releaseably engaging the cartridge notches to positively retain the cartridges within the respective compartments, wherein the means for engaging the cartridge notches comprises:
a. a flat strip mounted to the compartment floors adjacent the open sides thereof; and
b. a plurality of tabs upstanding from the strip, each tab straddling a rib such that the tab extends partially into the compartments on both sides of the rib to create right and left tab sections in the open side of each compartment, the right tab section having a left edge and the left tab section having a right edge.

6. The improved container of claim 5 wherein:
a. the tabs extend upwardly from the compartment floor approximately 0.08 inches; and
b. the right and left tab sections extend approximately 0.20 inches from the respective ribs into the open sides of the adjacent compartments.

7. The improved container of claim 5 wherein the left edge of the right tab section slopes at an angle within the range of about 0 and 30 degrees with the vertical.

8. The improved container of claim 7 wherein the left edge of the right tab section slopes at an angle of approximately 30 degrees to the vertical.

9. The improved container of claim 5 where the right edge of the left tab section slopes at an angle within the range of approximately 0 to 30 degrees with the vertical, so that the cartridges are urged by the right edge of the left tab section into notch engagement with the right tab section.

10. The improved cartridge of claim 9 wherein the right edge of the left tab section slopes at an angle of approximately 30 degrees to the vertical.

11. In combination with at least one selected computer data storage cartridge having a bottom surface defining a notch, apparatus for positively retaining the cartridge in a selected location comprising:
   a. a container having a ceiling, a floor, a back wall, a pair of spaced side walls connecting the floor and ceiling, and a plurality of vertical ribs spaced between the side walls and extending between the floor and ceiling to define a plurality of five sided open side compartments adapted to hold the tape cartridge; and
   b. a plurality of tabs upstanding from the container floor, a tab straddling each vertical rib and extending laterally a predetermined distance from the associated rib toward the center of the open side of each adjacent compartment to thereby create a right tab section and a left tab section in each open side adjacent the respective ribs, the right tab section of each compartment being adapted to engage the cartridge notch when the cartridge is inserted into the compartment from the open side,
      so that the cartridge is positively retained in the compartment by the right tab section.

12. The combination of claim 11 wherein the tabs are formed integrally with the container.

13. The combination of claim 11 further comprising an elongated flat strip fastened to the container floor, and wherein the tabs are formed integrally with the flat strip.

14. The combination of claim 13 wherein the tabs extend upwardly approximately 0.08 inches above the compartment floor.

15. The combination of claim 14 wherein the tab right and left sections extend approximately 0.20 inches from the respective ribs into the compartment open sides.

16. The combination of claim 15 wherein the edges of the left tab sections of each compartment make an angle of approximately 30 degrees with the vertical,
   so that the left tab sections urge the cartridges away from the left tab sections and into notch engagement with the right tab sections.

17. The combination of claim 16 wherein the left edges of the right tab sections of each compartment make an angle of approximately 30 degrees with the vertical.

18. The combination of claim 11 further comprising a hanger bar joined to the container near the junction of the back wall and ceiling, the hanger bar including an elongated flat strip and a lip downwardly depending from the strip,
   so that the container may be suspended by the hanger strip from a stationary member.

19. The combination of claim 18 wherein:
   a. the container is formed with at least one catch on the top wall, the catch having an inclined surface and a vertical surface; and
   b. the hanger bar strip is fabricated with at least one L-shaped clip adapted to engage the container ceiling and an opening adapted to receive the container catch and to cooperate with the catch vertical surface to releaseably secure the hanger bar to the container.

20. The combination of claim 18 wherein the container is manufactured with at least one latch in the bottom panel thereof for controlling tilting of the container about the hanger bar, the latch being fabricated with a hinge portion flexibly joined to the container bottom panel and a tapered ledge connected to the hinge portion,
   so that the container may be tilted freely in one direction and container tilting in the other direction is prevented by the latch.

21. A rail for joining two upstanding posts to suspend selected components therefrom in a vertical attitude comprising:
   a. an upturned lower channel having a short upturned end and a long leg;
   b. an upturned upper channel located above and horizontally displaced from the lower channel, the upper channel having an upturned end and a long leg; and
   c. a horizontal member connecting the long legs of the upper and lower channels, the horizontal member being located above the lower channel,
      so that the component can be suspended from the upturned end of the lower channel on a first rail and maintained in a vertical attitude by the long leg of the upper channel of a second rail vertically spaced below the first rail.

22. A library storage rack for storing selected containers comprising:
   a. a plurality of upstanding posts;
   b. a plurality of rails attached horizontally between the posts, the rails being vertically spaced a predetermined amount, each rail comprising:
      i. an upturned lower channel having a short upturned end and a long leg;
      ii. an upturned upper channel located above and horizontally displaced from the lower channel, the upper channel having an upturned end and a long leg; and
      iii. a horizontal member connecting the long legs of the upper and lower channels, the horizontal member being located above the lower channel,
         so that a container may be suspended from and slid along the upturned end of the lower channel of a first rail and the container is maintained in a vertical attitude by the long leg of the upper channel of a second rail spaced below the first rail.

23. Apparatus for storing selected data storage cartridges, the cartridges being generally shaped as parallelepipeds having bottom surfaces that define a notch therein, comprising:
   a. a storage rack comprising:
      i. at least two upstanding posts;
      ii. a plurality of rails attached horizontally between the posts, the rails being vertically spaced a predetermined amount, each rail comprising an upturned lower channel having a short upturned end and a long leg, an upturned upper channel located above and horizontally displaced from the lower channel, the upper channel having an upturned end and a long leg, and a horizontal member connecting the long legs of the upper and lower channels, the horizontal member being located above the lower channel; and b. at least one box means for positively retaining the cartridges therein, the box means being adapted to be suspended from the upturned end of the lower channel of a first rail and maintained in a vertical attitude by the long leg of the upper channel of a second rail spaced below the first rail.

24. The apparatus of claim 23 wherein the box means comprises:
 a. a container for holding the cartridges, the container having a ceiling, a floor, a back wall, a pair of spaced side walls connecting the floor and ceiling, and a plurality of vertical ribs spaced between the side walls and extending between the floor and ceiling to define a plurality of five-sided open side compartments adapted to hold the tape cartridges;
 b. a plurality of tabs upstanding from the container floor, a tab straddling each vertical rib and extending laterally a predetermined distance from the associated rib toward the center of the open side of each compartment adjacent the rib to thereby create a right tab section and a left tab section in each open side adjacent the respective ribs, the right tab section of each compartment being adapted to engage the cartridge notch when the cartridge is inserted into the compartment to positively retain the cartridge in the compartment; and
 c. a hanger bar joined to the container and adapted to hang on the upturned end of the lower channel of the first rail.

25. The apparatus of claim 24 wherein the container bottom panel is formed with latch means for cooperating with the upper channel of the second rail to permit tilting the box means about the hanger bar in a first direction to a vertical attitude and for preventing tilting in a second direction to a non-vertical attitude.

26. The apparatus of claim 25 further comprising a lowermost horizontal rail in the storage rack, the lowermost rail comprising:
 a. a horizontal brace attached to the posts; and
 b. a U-shaped portion joined to the horizontal brace, the U-shaped portion having an upturned back leg spaced outwardly from the higher rails and at a location to contact a container back wall to maintain the box means in a non-vertical attitude, and an upturned front leg adapted to cooperate with the container latch means to permit tilting the container in a first direction to contact the U-shaped portion back leg and to releaseably prevent tilting in a second direction.

* * * * *